(12) United States Patent
Geist et al.

(10) Patent No.: US 11,107,063 B2
(45) Date of Patent: Aug. 31, 2021

(54) METHOD AND APPARATUS FOR PROVIDING A TOLL SERVICE AND FLEXIBLE TOLL DEVICE

(71) Applicant: GEOTOLL, INC., Cooper City, FL (US)

(72) Inventors: Wyatt Drake Geist, Davie, FL (US); Jaime Andres Borras, Pembroke Pines, FL (US)

(73) Assignee: GeoToll, Inc., Cooper City, FL (US)

( * ) Notice: Subject to any disclaimer, the term of this patent is extended or adjusted under 35 U.S.C. 154(b) by 0 days.

(21) Appl. No.: 16/030,504

(22) Filed: Jul. 9, 2018

(65) Prior Publication Data

US 2019/0012656 A1 Jan. 10, 2019

Related U.S. Application Data

(62) Division of application No. 14/091,678, filed on Nov. 27, 2013, now Pat. No. 10,019,706.

(51) Int. Cl.
*G06Q 20/32* (2012.01)
*G07B 15/06* (2011.01)
(Continued)

(52) U.S. Cl.
CPC ........ *G06Q 20/3278* (2013.01); *G06Q 20/26* (2013.01); *G07B 15/00* (2013.01); *G07B 15/063* (2013.01); *G08G 1/017* (2013.01)

(58) Field of Classification Search
CPC .... G01C 21/3461; G01C 21/30; G01C 21/34; G01C 21/3438; G01C 21/3617;
(Continued)

(56) References Cited

U.S. PATENT DOCUMENTS 5,602,919 A 2/1997 Hurta et al.
5,991,749 A 11/1999 Morrill, Jr.
(Continued)

FOREIGN PATENT DOCUMENTS

JP 2009140061 6/2009

OTHER PUBLICATIONS

"Geotoll's payment app could be the smart answer to tolling interoperability," by Jon Masters, ITS International, 'Charging, Tolling, & Rad Pricing,' Jul. 30, 2013 (Year: 2013).*
(Continued)

*Primary Examiner* — George Chen
*Assistant Examiner* — Brian Adams Heflin
(74) *Attorney, Agent, or Firm* — The Concept Law Group, PA; Scott M. Garrett; Scott D. Smiley

(57) ABSTRACT

A system, mobile device, backend server, and RFID toll module work in cooperation to automatically pay vehicular tolls to a toll agency that operates toll stations along a roadways travelled by the user of the mobile device. Upon approaching a toll station the mobile device enables the RFID toll module. The toll reader at the toll station transmits a toll reader signal that is received by the RFID toll module, which responds by transmitting a unique identifier. The unique identifier is associated with the mobile device at a toll account maintained by a toll service backend server. Upon completion of a toll transaction, the RFID toll module indicates the transaction to the mobile device, which forwards toll transaction information to the toll service backend server for payment from the toll account to the toll agency.

9 Claims, 10 Drawing Sheets

(51) Int. Cl.
  *G08G 1/017* (2006.01)
  *G06Q 20/26* (2012.01)
  *G07B 15/00* (2011.01)

(58) Field of Classification Search
  CPC ...... G07B 15/02; G07B 15/06; G07B 15/063;
          G07B 15/0723; G07B 15/00; G08B
          21/0275; A63B 2225/54; B07C
          2301/0016; B32B 2519/02; G06Q 20/26;
          G06Q 20/3278; G08G 1/017; G09F
          3/0335; H04W 12/06; H04W 12/00407;
          H04W 12/00502; H04W 12/08; H04W
          4/021; H04W 4/40; H04W 4/80; G06K
          19/041; G06K 19/0707; G06K 19/0725;
          G06K 19/073
  USPC .......................................................... 705/13
  See application file for complete search history.

(56) References Cited

U.S. PATENT DOCUMENTS

| | | | |
|---|---|---|---|
| 6,956,472 | B1 | 10/2005 | Walcott, Jr. |
| 7,254,382 | B2 | 8/2007 | Hasan et al. |
| 7,649,503 | B2 | 1/2010 | Heo |
| 8,026,832 | B2 * | 9/2011 | Weiss .................... G06Q 20/10 340/928 |
| 8,130,104 | B1 | 3/2012 | Braiman |
| 8,179,260 | B2 | 5/2012 | Pillai |
| 8,311,559 | B1 * | 11/2012 | Morrow .............. H04M 1/7253 455/456.1 |
| 8,344,886 | B2 | 1/2013 | Gravelle et al. |
| 8,587,454 | B1 * | 11/2013 | Dearworth ........... G07B 15/063 340/928 |
| 9,665,991 | B2 | 5/2017 | Simanek et al. |
| 2003/0107521 | A1 | 6/2003 | Matsuura et al. |
| 2004/0119606 | A1 | 6/2004 | Lee et al. |
| 2004/0119609 | A1 | 6/2004 | Solomon |
| 2005/0197976 | A1 | 9/2005 | Tuton et al. |
| 2006/0015394 | A1 | 1/2006 | Sorensen |
| 2006/0082470 | A1 * | 4/2006 | Zhu ...................... G07B 15/063 340/928 |
| 2006/0279413 | A1 | 12/2006 | Yeager |
| 2007/0162913 | A1 * | 7/2007 | Moser .................... G06F 9/542 719/318 |
| 2007/0252678 | A1 * | 11/2007 | Garcia Alonso ..... G07B 15/063 340/10.31 |
| 2008/0084310 | A1 * | 4/2008 | Nikitin ................. G06K 7/0008 340/572.7 |
| 2009/0143104 | A1 | 6/2009 | Loh et al. |
| 2010/0026465 | A1 | 2/2010 | Gravelle et al. |
| 2010/0065630 | A1 | 3/2010 | Spencer |
| 2010/0085213 | A1 | 4/2010 | Turnock et al. |
| 2010/0287621 | A1 | 11/2010 | Nagy |
| 2011/0082797 | A1 | 4/2011 | Glachant et al. |
| 2011/0161140 | A1 | 6/2011 | Polt |
| 2011/0208568 | A1 * | 8/2011 | Deitiker ............... G07B 15/063 705/13 |
| 2012/0074232 | A1 | 3/2012 | Spodak et al. |
| 2012/0178366 | A1 | 6/2012 | Levy |
| 2012/0168516 | A1 * | 7/2012 | Bolger ............. G06K 19/07758 235/492 |
| 2012/0232964 | A1 | 9/2012 | Brands |
| 2013/0018705 | A1 * | 1/2013 | Heath .................... G08G 1/017 705/13 |
| 2013/0090991 | A1 | 4/2013 | Underwood |
| 2013/0110685 | A1 | 5/2013 | Dempski |
| 2013/0222156 | A1 | 8/2013 | Colburn, III |
| 2014/0015638 | A1 * | 1/2014 | Cochran ............ G06K 19/0725 340/5.65 |
| 2014/0025444 | A1 | 1/2014 | Willis |
| 2014/0180773 | A1 | 6/2014 | Zafiroglu et al. |
| 2015/0058099 | A1 | 2/2015 | Spinelli et al. |
| 2019/0355185 | A1 * | 11/2019 | Plafchan ........... G06K 7/10297 |

OTHER PUBLICATIONS

"RFID-Based Multiprotocol Smartphone Tolling: A New Road to Interoperability," by GeoToll, ATI Webinar, Sep. 18, 2013 (Year: 2013).*
"Toll Interoperability Sought as Electronic Systems," by Dan Calabrese, May 20, 2013 (Year: 2013).*
"GeoToll users NFC to manage RFID road toll payments," by Karl Dyer, Jul. 4, 2013 (Year: 2013).*
"New app allows drivers to skip tollbooths on Illinois Tollways," by James Lawson, Sep. 1, 2016 (Year: 2016).*

* cited by examiner

METHOD AND APPARATUS FOR PROVIDING A TOLL SERVICE AND FLEXIBLE TOLL DEVICE

CROSS REFERENCE

This application is a divisional application of U.S. patent application Ser. No. 14/091,678, filed Nov. 27, 2013, now U.S. Pat. No. 10,019,706, which was a utility conversion of provisional application No. 61/730,495, filed Nov. 27, 2012, the contents and disclosure of each of which are hereby incorporated by reference in their entirety.

FIELD OF THE DISCLOSURE

The present disclosure relates generally to automated vehicular toll collection, and more particularly to mobile smartphone applications that work in conjunction with an RFID-enabled module for transacting and processing tolls.

BACKGROUND

Tollways and tollbooths, such as are commonly used on turnpike highways and other toll roads, are used to collect tolls to pay for road maintenance and other costs associated with the toll road. While in the past, and to some extent it is still the case, drivers were forced to stop and pay with currency at each toll plaza, it is increasingly common to use electronic toll collection that allows drivers to simply drive through a toll plaza at ordinary speed. In some automated toll systems, a radio transponder, that can be active or passive, and is located in the vehicle, is read by a radio signal as the vehicle passes under a gantry in a toll plaza. The toll plazas are often operated by a toll agency, which may be a private agency or a government agency. Some examples of toll agencies include SunPass and EZ-Pass. The transponder, typically being mounted in a vehicle, allows for little flexibility when one changes vehicles or is using a rental car. A transponder also lacks the ability to be secured so as to prevent toll fraud or allow tolls in case the vehicle (or transponder) is stolen.

The United States Department of Transportation (USDOT) released an Intelligent Transportation Systems (ITS) Strategic Research Plan for 2010-2014 at the end of 2009. The ITS (its.dot.gov) website discloses the plan as assuming government investment of upwards of $100 million per year for five years. The tolling industry handles its customer base in a somewhat parochial way. In actuality, anyone using public roadways may be seen as a customer. Each tolling facility tracks customers for data such as account information, volume and frequency of trips and where these customers reside. However, the existing agencies do little to incentivize customers to increase user usage of toll agency services. Marketing and rewards programs are rarely used. Therefore, toll agencies focus on reducing costs while increasing reliability of technology solutions (such as ISO 18000 6C reader tag protocol for interoperability), greater efficiencies in logging individuals highway use, and better quality imaging technologies (such as high-definition), to collect delinquent fees from toll evaders, are seeking improved systems.

Current toll options include RFID Tags and Readers, and Transponders used by Toll Companies like EZPass and SunPass, from providers such as Kapsch lack interoperability. The US government issued a mandate for interoperability among various state tolling systems by 2016, accompanied by a plan to distribute and share revenues between the plethora of companies and agencies. A less-desirable default option has been the Toll-by-Plate system, where, rather than having a transponder, the gantry at a toll plaza captures an image of the vehicle's license plate and charges the toll to the owner or registered user associated with the license plate number. However, this system is not sufficiently accurate nor convenient; visibility may often be obscured with obstacles, highway gridlock, and weather, and costs are typically higher than with a more targeted system. Customers unaware of the Toll-by-Plate operation who have not established an account with the agency will typically be charged somewhat punitive charges in addition to the toll.

Accordingly, there is a need for a method and apparatus for an automated tolling system that provide the toll account owner more flexibility and security in tolling, and which preserves the accuracy and reliability of conventional automated tolling systems.

SUMMARY

The embodiments described herein describe a mobile device in communication with a RFID toll module that is capable of communicating with a wide variety of tolling systems and provide instant cross-platform, cross-protocol interoperability. The hardware and software based application integrates RFID, mobile smartphone and business-server based technologies. Embodiments can be customizable to work with current tolling technologies that are applied by toll agencies and providers. Embodiments provide a user-friendly paradigm for users to manage and pay their toll-bills. Embodiments disclosed herein are both portable and self-contained, and easily accessible, user-friendly, light and portable for users of the highway network in possession of mobile devices.

Embodiments include a radio frequency identification (RFID) toll tag and a toll application for payment of tolls that can be either embedded into the circuitry of a mobile device, or connectable to the mobile device through one of several interfaces, including but not limited to audio jack, micro-USB, BlueTooth or proprietary connector interface, such as for an iPhone. The RFID toll module can be embodied as a dongle or a protective cover/sleeve.

In some embodiments, a toll reader transmits a radio-frequency signal that is received by the RFID toll module, which has an RFID tag. The RFID tag, which can be in the form of an active or semi-passive RFID chip, becomes energized by the reader signal, which can comply with the standards of the EPC™ Class-1 Generation-2 RFID Protocol for Communication within the range of 860-960 MHz. A passive system can transmit out "back-scatter", which acts as Morse code that is sent back to the reader. A more active RFID chip mirrors the reader's frequency to transmit back the requisite data to it. The tag or chip then passes information to the high-level application either integrated into the RFID tag or chip, which is returned to the toll application on the mobile device. The RFID tag or chip can provide an identifier which is unique to the RFID tag, and the mobile device can then collect the vehicle/user's current location. There can be a memory in the RFID toll module to store or buffer the data transfers. The toll application, via the mobile device, transfers transaction information to a backend server of the toll service for processing. At the toll service backend, when the mobile device's location match those of the toll reader at the toll station, within an approved margin of error, the payment for the toll can be verified and processed. This is a further step of reconciliation and verification which enhances security.

The toll application is portable across various existing national and global systems, and compliant with multiple standards. The user sets up their account and may implement, for example, a parent-child relationship, with multiple sub-accounts for different user-members within a family/organization. When the RFID toll module is connected to the mobile device, it must be activated and registered to the toll application on the mobile device with the toll service. Thereafter, the RFID toll module will not work with another subscriber identity module (SIM) card. In order to use the RFID toll module with another SIM card, it must be deregistered and deactivated from the first one. The relationship always remains one-to-one. On the other hand, a single toll account can be associated with multiple RFID toll modules/mobile devices for multiple sub-accounts of the toll account.

A key factor in the system is portability and interoperability across platforms and RFID protocols, allowing the toll application and the RFID toll module to be used in various geographical areas and across multiple toll-companies. A possible mode of interface for communication between the component and the phone, but not limiting, could be a Serial Peripheral Interface bus (SPI) interface that implements a synchronous serial data link standard, operating in a full duplex mode. The communication between devices occurs in master/slave mode where the master device initiates and controls data communication, which in this scenario could be the phone itself.

In some embodiments, as the user's mobile device is traveling at vehicular speeds (above pedestrian speeds) and approaches toll station location (mapped into the application), the toll application selects the proper RFID tag for the approaching system, which includes the proper protocol fields for the different agencies using the same technology, and turns-on the RFID tag to receive the reader signal.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
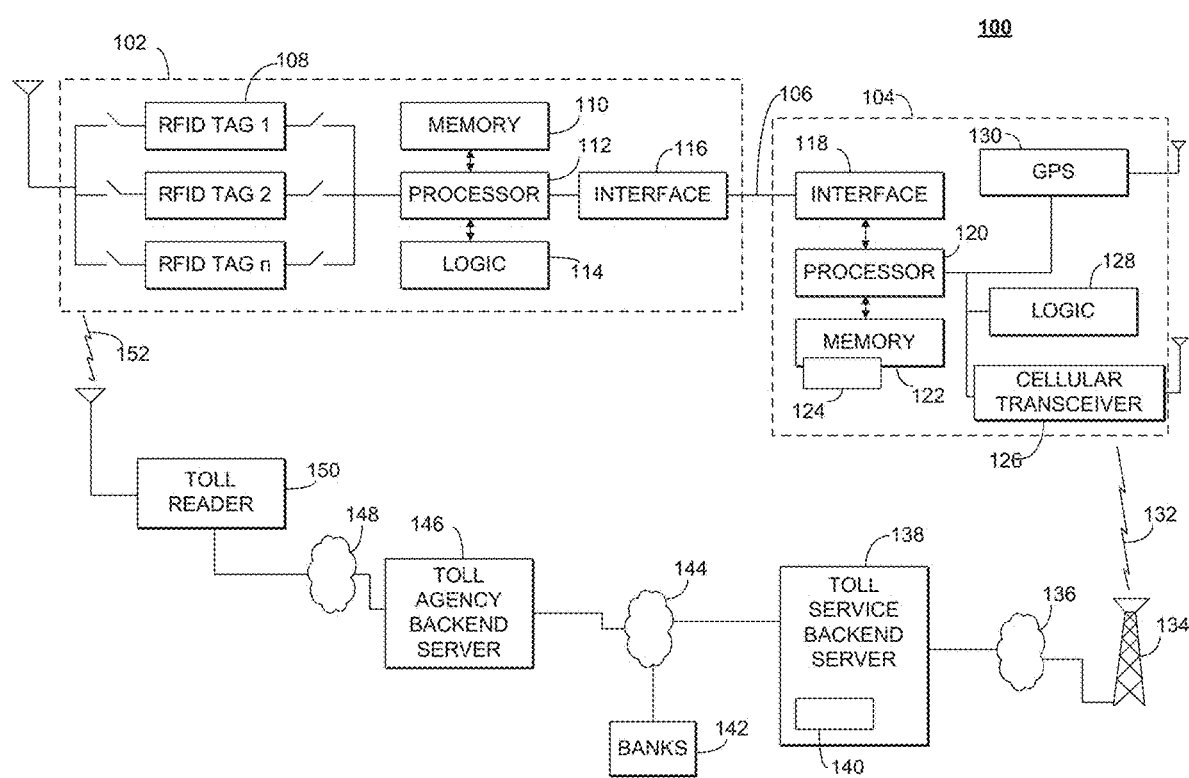
FIG. 1 is a block diagram of toll system architecture, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a system for automated payment of tolls that includes a toll reader at a toll station, and a RFID toll module that is coupled to a mobile device. The mobile device executes a toll application, and the RFID toll module includes at least one RFID tag that is configured to communicate with the toll reader using a RFID protocol for a toll transaction. A RFID tag selected to conduct the toll transaction communicates an identifier to the toll reader in response to being read by the toll reader during the toll transaction. The RFID toll module communicates transaction information to the toll application on the mobile device upon completion of the toll transaction. The system further include a toll service backend server that maintains a toll account that is associated with the mobile device, and to which the toll application on the mobile device communicates the transaction information. The toll service backend reconciles payment of the toll with a toll agency that operates the toll reader, using funds from the toll account.

Embodiments further include a method for automated toll transactions that includes determining, by a mobile device, that the mobile device is approaching a toll station, and in response the mobile device enabling a RFID toll module that is coupled to the mobile device. Upon being enabled, the RFID toll module receives a toll reader signal at the toll station and responds to the toll reader signal in a toll transaction. The method further includes the mobile device receiving from the RFID toll module an indication of the toll transaction, and in response the mobile device reporting the toll transaction to a toll service backend server via a cellular infrastructure for payment of the toll from a toll account associated with the mobile device and maintained by the toll service backend server.

In some embodiments, the user's mobile device has the toll application for paying and managing tolls while travelling in any vehicle and across multiple Regions and Toll Companies. This solution therefore allows a user to pay tolls in, for example, a rental car. The user's instance of the toll application is installed on the mobile device, and is registered to the user's toll account on the toll service backend system, and can execute on the mobile device as a background process at most times for conservation of power and device resources. At the same time, either as a physically and electronically attached component, or as a built-in and embedded module, an RFID toll module, including one or more RFID tags or chips with encoded logic for communicating to a toll reader. The RFID toll module can also include a processor (e.g. microprocessor or microcontroller) and other encoded logic. The toll application can be run in the background and can periodically send the user's location to the toll service backend server. While operating in the background, the toll application is in a sleep state, and remains there until activated by a command from, for example, the toll service backend server, which is typically generated by logic comparing the location of the mobile device with the locations of known toll stations. Once a transaction occurs and the RFID tag is read at a toll station, the toll application can, in some embodiments, transmit user identification and location information along with directional information and a timestamp to the toll service backend server, while the toll reader at the toll station sends analogous information to a toll agency backend server.

FIG. 1 is a block diagram of toll system architecture 100, in accordance with some embodiments. Radio frequency identification (RFID) module 102 operates as a wireless toll transponder that can be read by a toll reader 150, and it communicates with a mobile device 104 over a connection 106. The mobile device is a cellular telephone device that includes other functionality, and is of the type of cellular phone commonly referred to as a "smartphone." The RFID toll module include one or more selectable RFID tags 108, where each RFID tag 108 can be configured for a different RFID protocol that can be used by different toll readers 150 for different toll agencies. Each RFID tag 108 includes circuitry for receiving a toll reader signal 152, and responding to the toll reader signal 152 by transmitting an identifier that is unique to each RFID tag 108. The RFID tags 108 use a protocol such as, for example, that specified by ISO/IEC 18000-6C, ISO/IEC 18000-6B, the Interagency Group (IAG) Time Division Multiplexing (TDM) standard, or other known RFID interface standards. A conventional RFID toll transponder only contains a RFID tag 108, however, the RFID toll module 102 further contains a processor 112 that is coupled to a memory 110 that contains instruction code that is executed by the processor 112 to operate the RFID toll module 102. For one, the processor 112 can control switching of the various RFID tags 108 so that the correct RFID tag 108 is configured to receive and respond to the toll reader signal 152, as well as to be able to communicate with the processor 112. Logic circuitry 114, that is also controlled by the processor 112, can perform tasks such as switching, energy harvesting from the toll reader signal 152, and other functions. The processor 112 is further coupled to an interface 116 that allows the RFID tag device 102 to communicate with the mobile device 104 over connection 106. The RFID toll module 102 can be passive, active, or semi-active. An active RFID toll module device includes a battery (not shown) to power the various components. A passive RFID toll module device 102 scavenges energy from the reader signal 102, as is known, to store energy that is then used to respond. The connection 106 can be a wired or wireless connection, such as a universal serial bus (USB) connection, audio connection, audio jack connection, or other connections, as will occur to those skilled in the art.

The mobile device 104 has a similar interface 118 that is coupled to a processor 120 of the mobile device 104. A memory 122 is coupled to the processor 120 and contain instruction code for operating the mobile device 104, and includes a toll application 124. The toll application is able to access resources of the mobile device, such as a cellular transceiver 126 and a satellite positioning system receiver such a Global Positioning System receiver (GPS) 130. The mobile device also contains additional circuitry and logic for carrying out various tasks and operations of the mobile device. The cellular transceiver 126 communicates with a cellular infrastructure 134 using cellular signals 132.

The RFID toll module 102 and the mobile device 104 are co-located, and taken by a user in a vehicle. The toll application 124 can periodically report location information to a toll service back end server 138 that is operated by a toll service provider to which the user has subscribed. The location information is transmitted to the toll service backend server over the cellular infrastructure 134 that can forward the information through a network 136 such as the Internet. When the vehicle is approaching a toll station (e.g. a toll plaza, or toll booth) that is RFID enabled, the toll application can communicate with the RFID toll module 102 to configure it for the appropriate RFID tag 108. The toll service backend server 138 can maintain a map of toll stations and determine from the received location information that the vehicle is approaching a toll station. Alternatively, the toll application 124 can determine the approach of a toll station locally, in the mobile device, using, for example, a mapping application and location information from the GPS receiver 130. The toll application 124, via the interface 118 of the mobile device 104, communicates configuration instructions to the processor 112 of the RFID toll module 102, indicating the selected configuration to be used. In response, the processor 112 can configure the RFID toll module 102 so that the selected RFID tag 108 is connected to receive and respond to toll reader signals 152. In some embodiments one or more protocol stacks for various toll reader protocols can be stored in the RFID toll module 102 which can be loaded into the RFID tag 108. In some embodiments the protocol stack can be provided by the mobile device 104 upon enabling the RFID toll module 102.

As the vehicle approaches a toll station it is detected by the toll reader 150 such as by use of magnetic sensors in the traffic lane corresponding to the toll reader 150. The toll reader signal 152 is received by the RFID tag 108, which responds with the identifier of the RFID tag 108. The toll reader signal 152 can, in some embodiments, contain information, such as an identifier of the toll reader 150. The toll reader 150 and toll agency backend server 146 are operated by a toll agency that can be contracted with a governmental agency. Examples of toll agencies include, for example, those known as SunPass, EZPass, and FasTrack. Upon receiving a response from the RFID tag 108, the toll reader 150 communicates the transaction information to a toll agency backend server 146 over a network 148, such as the Internet. Likewise, the RFID toll module 102 communicates transaction information to the toll application 124, which in turn transmits the transaction information to a toll service backend server 138. The toll service backend server 138 maintains an account 140 that corresponds to the RFID toll module 102 and/or the toll application 124. The toll agency backend server 146 and the toll service backend server 138 include hardware to support at least one processor that executes instruction code cause the servers to perform the various tasks described herein, among other task.

Figure 2:
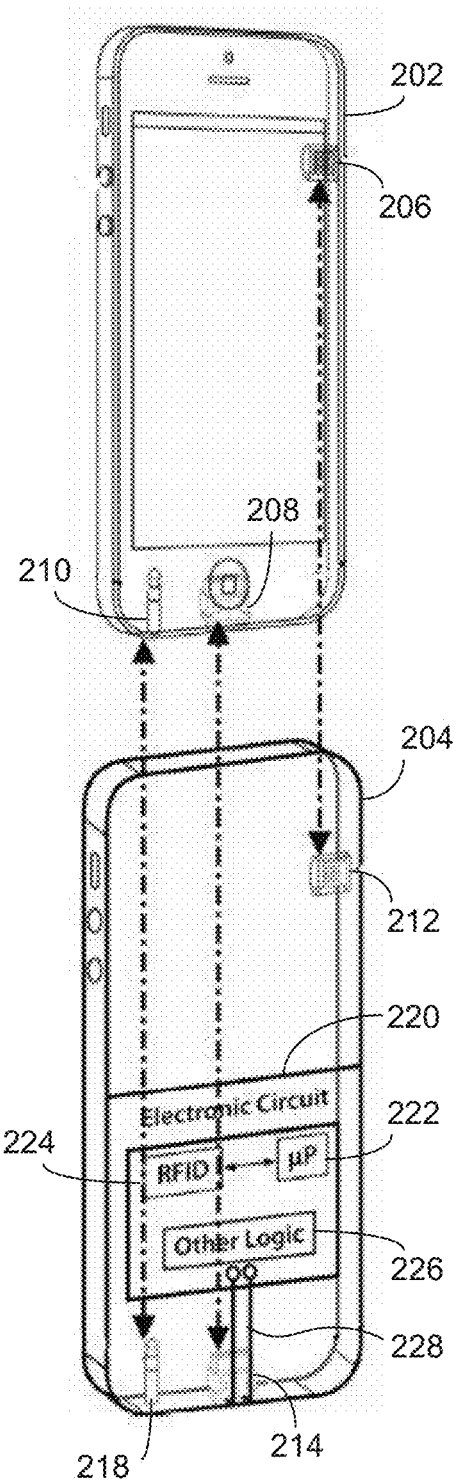
FIG. 2 is an isometric view of a mobile device and sleeve tagged with an RFID toll module connected to the phone, in accordance with some embodiments.

FIG. 2 is an isometric view 200 of a mobile device 202 and sleeve 204 tagged with an RFID toll module connected to the mobile device 202, in accordance with some embodiments. The sleeve 204 can be a cover or jacket that fits over the phone 202. The sleeve contains circuitry 220 for a RFID toll module, such as RFID toll module 102 of FIG. 1, and includes a processor 222, RFID tag 224, and other logic 226 (e.g. memory, switches, and so on). The mobile device 202 includes various ports and interfaces, such as a speaker 206, USB connector 208, and an audio jack input 210. The sleeve can connect to the phone using one of these, or some other modality. For example, the sleeve 204 can contain an audio receiver 212 that corresponds to the speaker 206 for receiving audio signals that are interpreted by the circuitry 220. In some embodiments the sleeve contains a USB connector 214 that corresponds to, and mates with the USB connector 208 of the mobile device 202, and communication can occur using a USB protocol. In some embodiments the sleeve 204 can contain an audio connector 218 that corresponds with the audio jack connector 210 of the mobile device 202.

Figure 3:
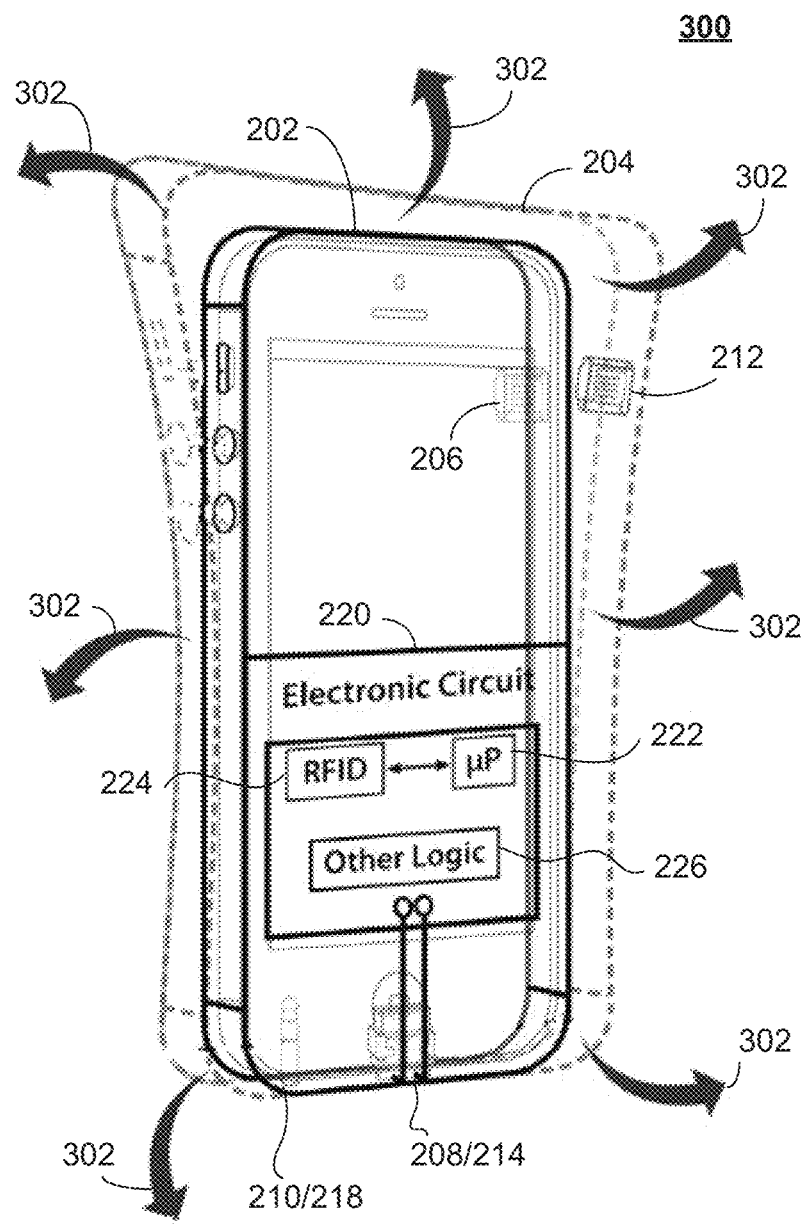
FIG. 3 is an isometric view of a mobile device and sleeve tagged with an RFID toll module that is placed over, and connected to the mobile device, in accordance with some embodiments.

FIG. 3 is an isometric view 300 of a mobile device 202 and sleeve 204 tagged with an RFID toll module circuit 220 that is placed over, and connected to the mobile device 202, in accordance with some embodiments. The sleeve 204 can be fabricated of a flexible material, as indicated by arrows 302, allowing the sleeve 204 to be easily placed on phone 202 such that it will be held in place on the phone 202. The sleeve can be substantially the same as that shown in FIG. 2. While shown as a flexible sleeve or cover in FIGS. 2-3, it will be appreciated by those skilled in the art that the RFID toll module can be packaged in numerous other forms.

Figure 4:
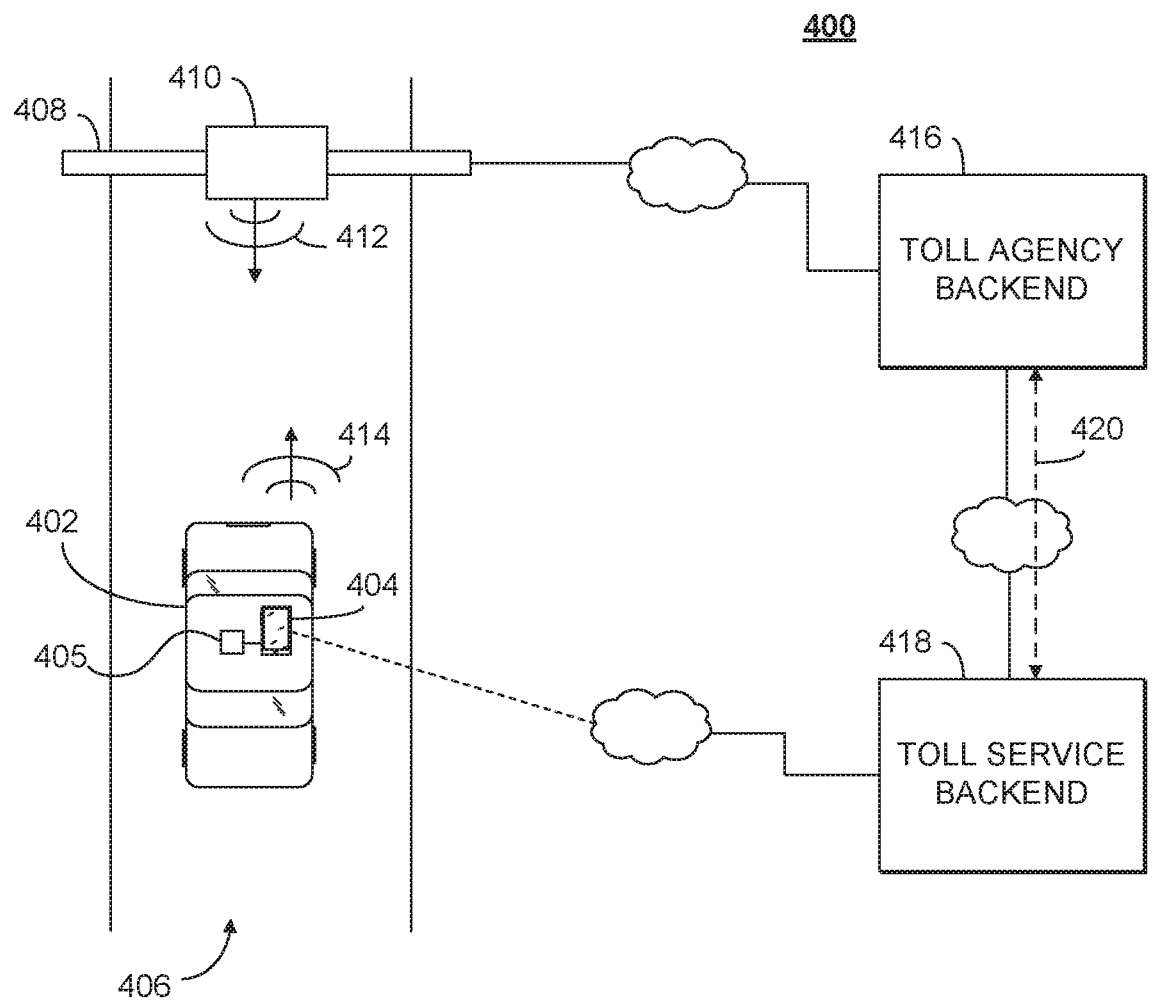
FIG. 4 is system diagram of a toll system including a toll plaza, toll agency back end, and toll service back end, in accordance with some embodiments.

FIG. 4 is system diagram of a toll system 400 including a toll plaza 408, toll agency back end 416, and toll service back end 418, in accordance with some embodiments. A vehicle travels in a traffic lane 406 towards the toll plaza 408. The vehicle carries a driver or passenger who owns or possesses a mobile device 404 that coupled to a RFID toll module 405 such as RFID toll module 102 of FIG. 1. As the vehicle 402, and therefore the mobile device 404 and RFID toll module 405 approach the toll plaza 408, the mobile device 404 can be in communication with the toll service backend server 418 (which can be a cluster of several different hardware entities and different servers), the mobile device 404 enables the RFID toll module 405. The mobile device, which is executing a toll application, can enable the RFID toll module 405 based on a command from the toll service backend server 418, which is in response to location information transmitted to it from the mobile device 404, or the mobile device 404 can determine its proximity to the toll plaza 408 on its own using location information and a mapping application. When the vehicle is within a certain distance from the toll plaza 408, a toll reader 410 can detect the vehicle and begin transmitting a reader signal 412. The RFID toll module 405 receives the reader signal 412 and responds 414 with an identifier. The identifier is transmitted to the toll agency backend server in a transaction record. Likewise, the mobile device 404 transmits transaction information to the toll service backend server 418. The transaction can be reconciled 420 between the toll agency backend server 416 and the toll service backend server 418. The transaction information can include, for example, identity, geographical location, a timestamp, and the direction of travel for processing by the toll service backend server 418. The toll reader 410 can transmit similar information to the toll agency backend server 416.

Figure 5:
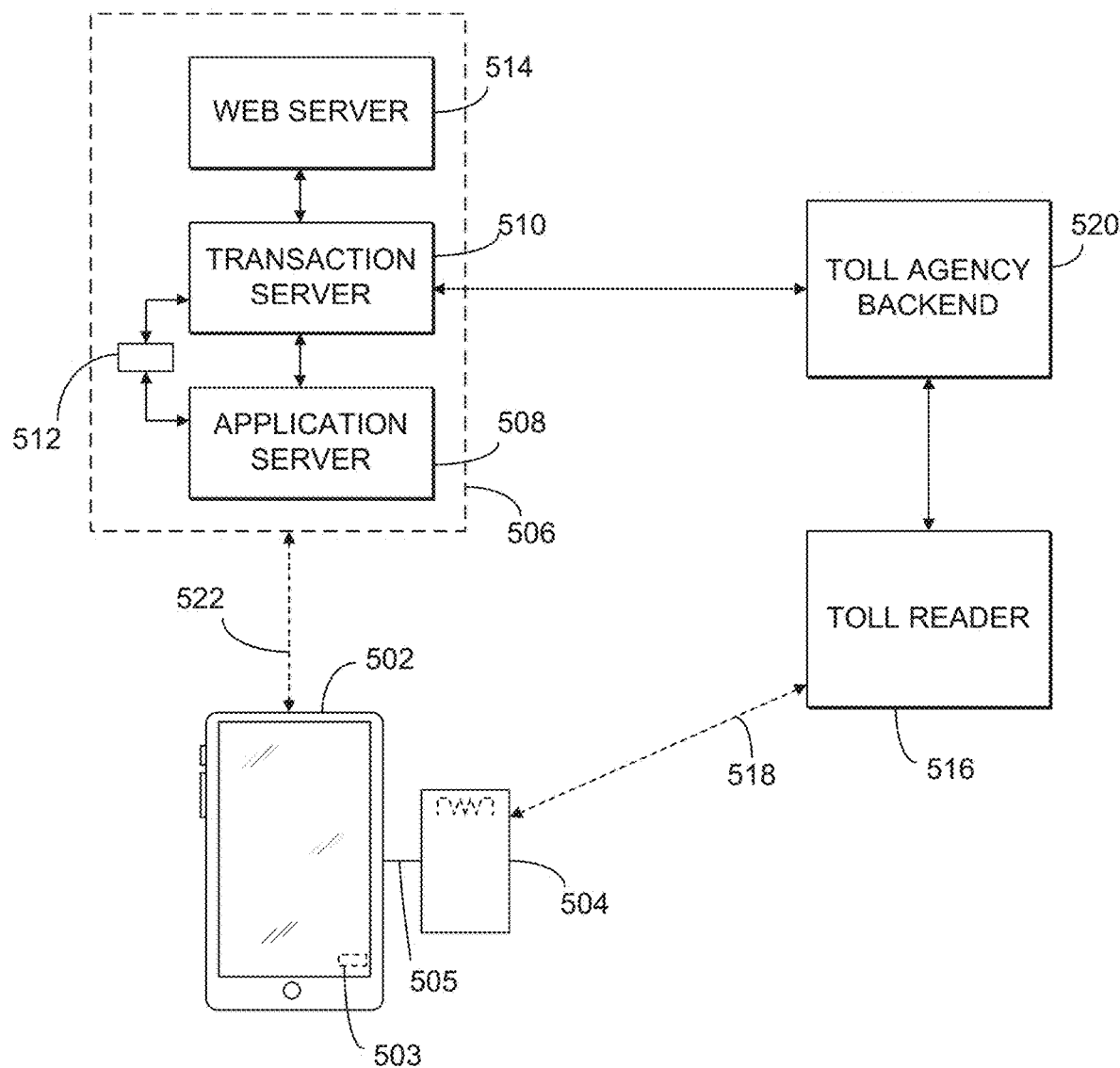
FIG. 5 is system diagram for a toll system, in accordance with some embodiments.

FIG. 5 is system diagram for a toll system 500, in accordance with some embodiments, and shows a process flow of a system such as that shown, for example, in FIG. 4. A mobile device 502 having a toll application 503 is coupled to a RFID toll module 504 over a connection 505. The mobile device 502 and RFID toll module 504 can be substantially similar to those shown in FIG. 1. A toll service backend 506 can include an application server 508, a transaction server 510, and a web server 514. Furthermore, the backend 506 maintains an account 512 associated with the mobile device 502 and/or the RFID toll module 504. The toll application can communicate with the application server (e.g. via the cellular infrastructure and Internet) to process tolls on behalf of the user of the mobile device 502. The application server 508 communicates with the transaction server 510 to log and record toll transactions. The transaction server also communicates with the toll agency backend server 520 for reconciliation of toll payments. The web server 514 provides an interface for a user to access the user's account 512, add fund, view transactions, and so on. The RFID toll module 504 can be read by a toll reader 516 at a toll plaza or toll station. When being read, the toll reader 516 can transmit some information to the RFID toll module 504, such as an identifier of the toll reader, for verification. The toll application 503 can transmit transaction information, including, for example, the identifier of the toll reader 516, a time stamp, location information, and so on, to the application server 508. The application server 508 can also provide the toll application 503 with account information for the account 512 that can be displayed on a display of the mobile device 502.

Figure 6:
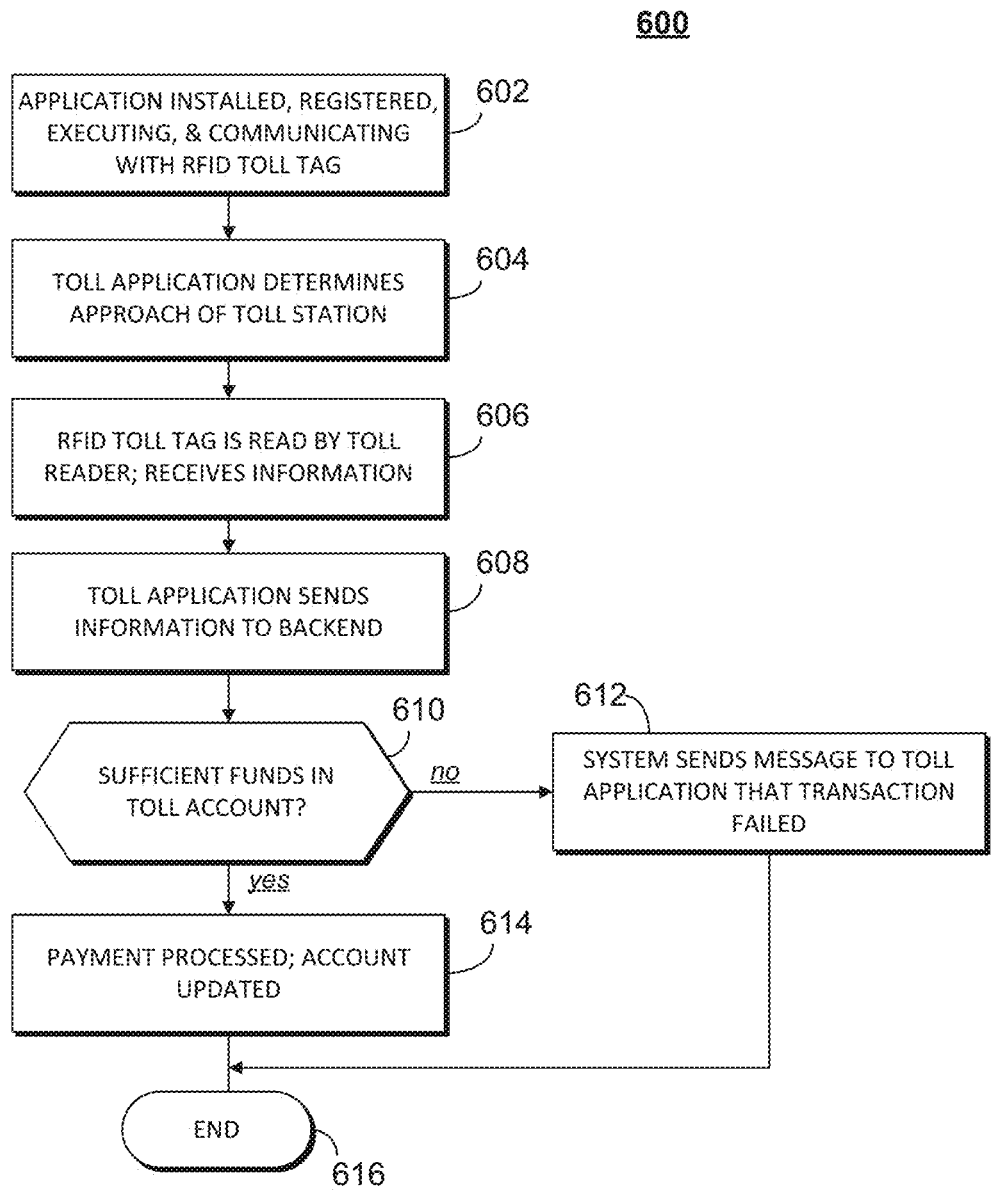
FIG. 6 is flow chart diagram of a method for automated tolling, in accordance with some embodiments.

FIG. 6 is flow chart diagram of a method 600 for automated tolling, in accordance with some embodiments. Each box in the follow chart, and in flow charts of other subsequent figures, represent an abstraction of one or more processes or operations undertaken various entities in the system. The method 600 can start in process 602 where the toll application is installed on the mobile device, and it is registered with a toll service backend and associated with an account maintained by the toll service backend server. The account has a one to one correspondence with an identifier of the mobile device, such as, for example, an identifier on a subscriber identity module (SIM card) in the mobile device. If the mobile device is not registered, the toll service can respond with a message asking the user to set up an account. The toll application is also able to communicate with a RFID toll module. In process 604 the toll application determines it is approaching a toll station or toll plaza. The toll application can make the determination by, for example, providing the backend server with periodic location updates and in response the backend server can message the toll application when it is approaching a toll station. Alternatively, the toll application can make the determination locally using location information and a mapping application. In response, the toll application communicates with the RFID toll module to configure it to be read at the toll station as the vehicle passes through the toll station. In process 606 the RFID toll module is read by the toll reader, and receives or generates transaction information, which is communicated to the toll application. In process 608 the toll application transmits the transaction information to the toll service backend, such as by a cellular infrastructure. The toll service backend can determine whether there are sufficient funds available in the user's account to pay for the toll in process 610. Assuming there are sufficient funds, in process 614 the payment can be processed (immediately, or later in a batch operation), and the account updated accordingly. If in process 610 there are not sufficient funds available, the method 600 proceeds to process 612 where the toll service backend indicates such to the toll application, and indicates that the transaction failed. In some embodiments, however, the user can set up automatic replenishment so that whenever the funds in the user's account falls below a preset value, a preset amount is transferred from the user's bank or charged to the user's credit card, for example.

Figure 7:
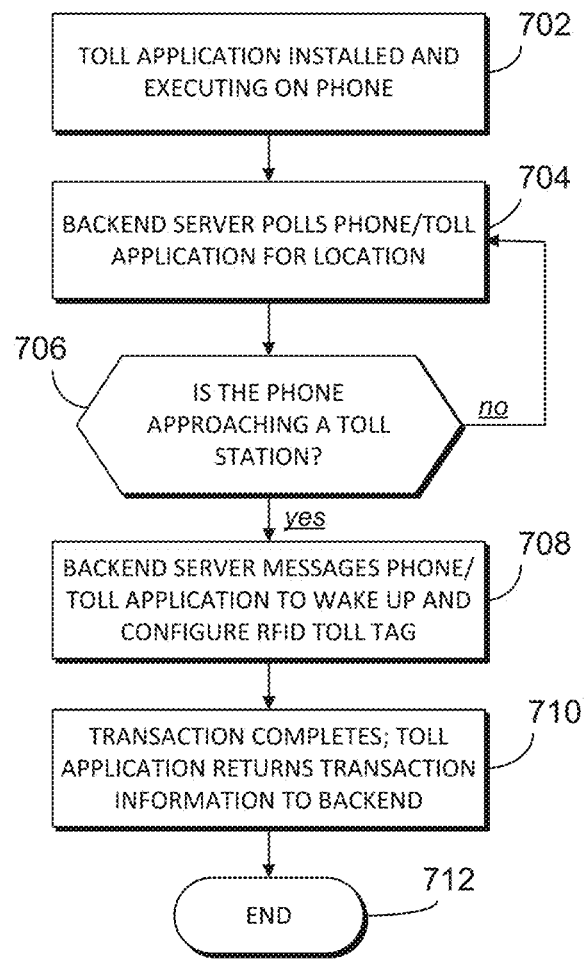
FIG. 7 is a flow chart diagram of a method for completing a transaction in an automated tolling system, in accordance with some embodiments.

FIG. 7 is a flow chart diagram of a method 700 for completing a transaction in an automated tolling system, in accordance with some embodiments. The method 700 can start in process 702, where the toll application is installed and executing on a mobile device, and communicatively coupled to a RFID toll module. In process 704 the toll service backend server periodically polls the toll application for location information. In process 706 the toll service backend server determines whether the mobile device, based on the location information, is approaching a toll station. Alternatively, as described elsewhere herein, the toll application on the mobile device can make this determination using a mapping application. If not, the method loops between processes 706 and 704. When the toll service backend server determines that the mobile device is approaching a toll station, in process 708 the backend server message the toll application to wake up the toll application (assuming it was in a sleep mode or state), which in turn configures the RFID toll module accordingly. In process 710 the transaction completes with the toll application transmitting transaction information to the toll service backend service for payment and reconciliation with the toll agency. The method 700 can then end 712, or return to process 704.

Figure 8:
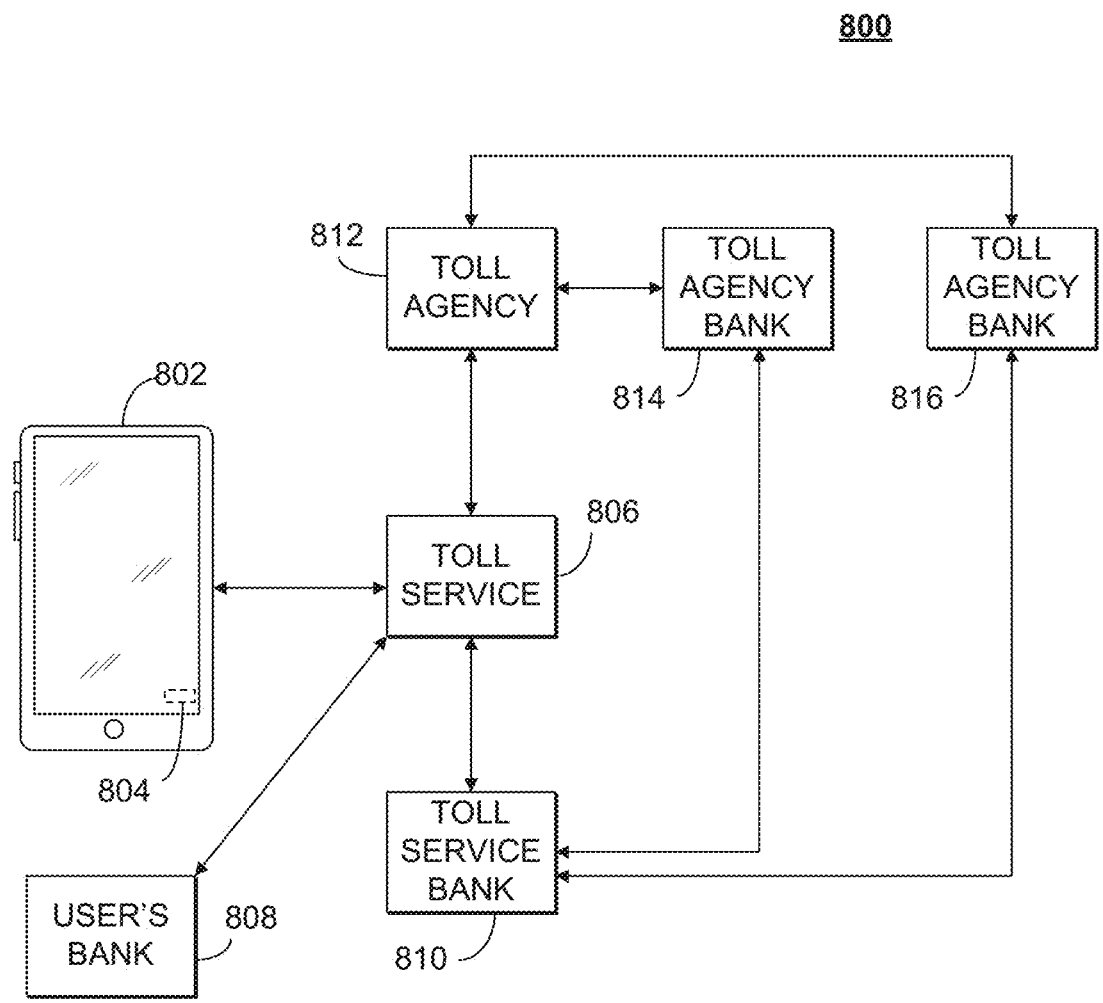
FIG. 8 is a block diagram of a financial system for conducting automated tolling through a toll service, in accordance with some embodiments.

FIG. 8 is a block diagram of a financial system 800 for conducting automated tolling through a toll service, in accordance with some embodiments. The user's mobile device 802 executes a toll application 804 that allows the user to pay tolls using a RFID toll module (not shown). The mobile device 802, under control of the toll application 804, can communicate with a toll service server 806, which, among other tasks, maintains an account for the user, from which tolls are paid for the user by the toll service. The user can add funds to the account from the user's bank or credit card 808. The toll service can likewise use a bank 810 or other financial institution 810 to hold user funds in escrow until they are used to pay tolls. The toll service 806 can communicate with a toll agency 812 that charges tolls to be paid by the toll service. The toll agency can work with one or more banks 814, 816 for receipt of toll funds, which can be transferred to the banks 814, 816 from the toll service bank 810.

Figure 9:
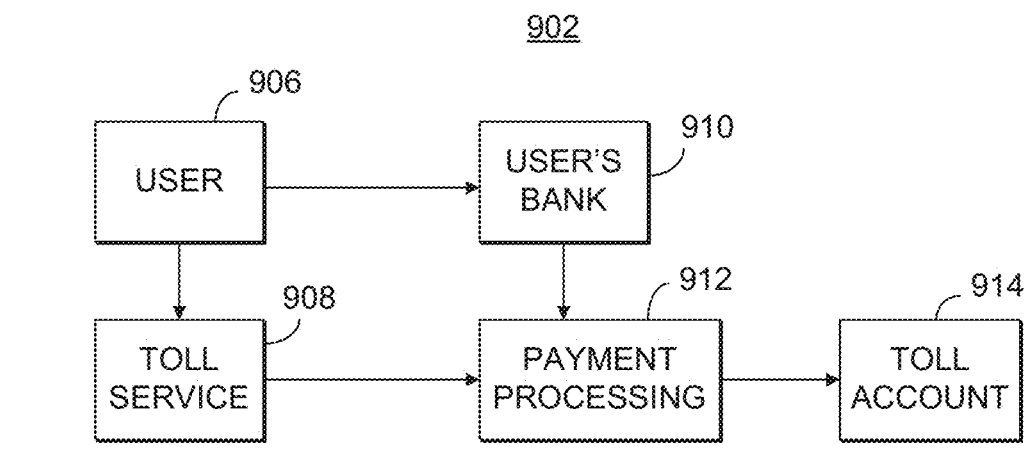
FIG. 9 is a system diagram of an automated tolling system for reconciling toll transactions, in accordance with some embodiments.
Figure 9:
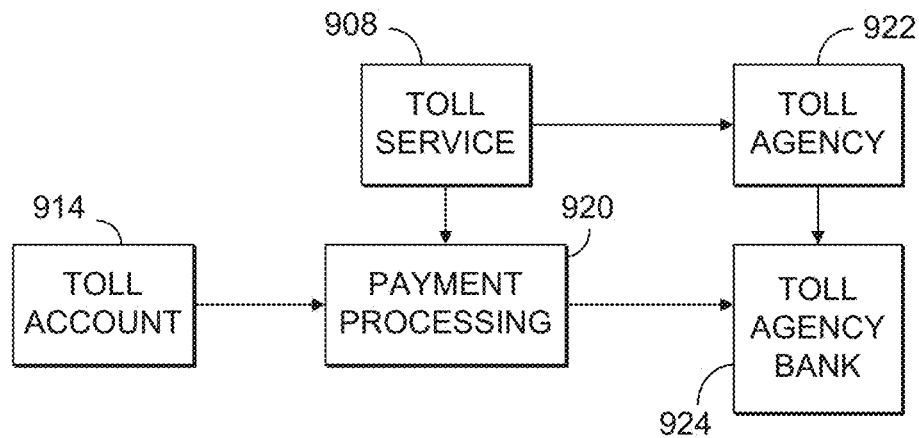

FIG. 9 is a system diagram of an automated tolling system 900 for reconciling toll transactions, in accordance with some embodiments. The system 900 show parallel processes for processing toll payment. There is a user side 902 and a server or reconciliation side 904. On the user side 902 a user 906, using, for example, the toll application on a mobile phone or a computer with Web access, can add funds to the user's account by, for example, contacting the toll service 908 (e.g. a server of the toll service). The process can involve the user's bank 910 and the toll service 908 performing payment processing 912, and funds are then added to the users toll account 914. The funds in the toll account can be used to pay tolls in accordance with the disclosure to one or more different toll agencies. Upon success of the payment processing 912, the user's account is updated to reflect addition of the funds.

On the reconciliation side 904, when it is time to reconcile payment of toll (either upon the toll transaction occurring, or at a batch processing time), funds from the user's toll account 914 can be forward for payment processing 920 by the toll service 908 to a toll agency 922. Upon success of the payment processing 920, the funds are transferred to the toll agency's bank 924. The successful transfer is then debited to the user's account 914.

Figure 10:
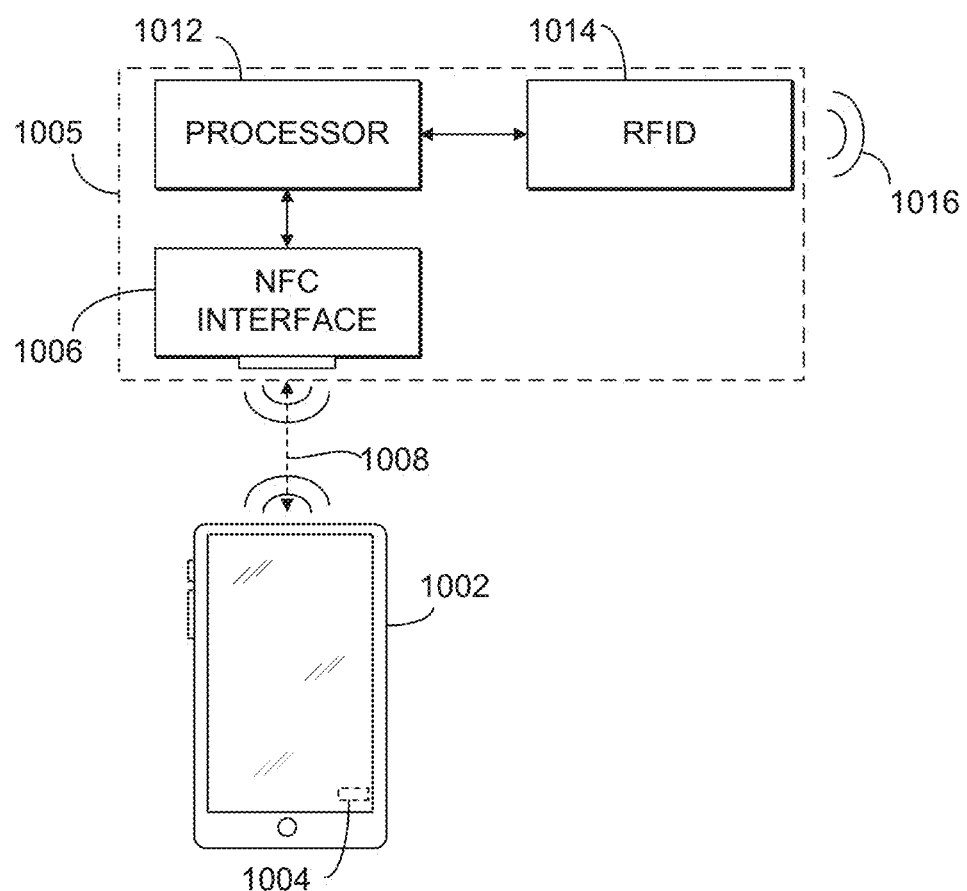
FIG. 10 is a system diagram of a mobile device and associated transponder for automated tolling, in accordance with some embodiments.

FIG. 10 is a system diagram 1000 of a mobile device 1002 and associated transponder RFID toll module 1005 for automated tolling, in accordance with some embodiments. The mobile device 1002 includes a toll application 1004 in accordance with the disclosure. The mobile device and the RFID toll module 1005 operate in master-slave configuration as in, for example, that shown in FIGS. 1-3. However, the communication 1008 between the mobile device 1002 and the RFID toll module 1005 is by wireless near field communication (NFC), such as that specified by ISO/IEC 18000-3 which has an effective range of about 10 cm and operates at 13.56 MHz. Other known NFC protocols can be used equivalently. The RFID toll module 1005 includes an NFC interface 1006 that can communicate, using the NFC protocol, with the mobile device 1002. The NFC interface is coupled to the processor 1012 that configured a RFID tag 1014. When the mobile phone 1002 is approaching a toll station, it communicates with the RFID toll module 1005 and commands it to configure the RFID tag 1014 to be read by the toll reader. Upon receiving a toll reader signal, the RFID tag 1014 responds 1016 with an identifier that unique to the RFID tag 1014 (or that can be assigned or provided by the toll application). Once the RFID tag 1014 is read, the processor 1012 receives the transaction information and forwards it over the NFC interface 1006 which in turn transmits it via link magnetic link 1008 to the toll application on the mobile device 1002. The mobile device in turn transmits the transaction information to the toll service backend server (not shown).

Generally, in operation, when the RFID tag is read, the RFID tag identifier is sent to the toll service backend server in encrypted form along with the identifier of the mobile device. The toll service backend server verifies whether the device is already registered with the toll service, and if so, whether it belongs to the user of the mobile device, to someone else who is registered to the toll service, or whether it is an unregistered device. If the device is new and unregistered, then the user is asked to register device by entering all user and mobile device related information. Each account can have several users registered to the account so that different mobile devices and different RFID toll modules can be used with the same account. Any unregistered devices will be denied transaction settlement.

Using the toll application, the user can control billing, make payments, track payment history, update account info, manage organizational sub-accounts, check usage transaction history, and request customized expense reports to be sent to their email either in Excel or as a PDF format, or as an SMS Message to their phone or mobile device. If the toll application detects that the user's account contains insufficient funds for a transaction, the toll application can send a N/ACK or null-acknowledgment to the RFID toll module's processor to disable the RFID tag, and then toll reader signals will essentially be ignored. However, this can be avoided if an ACK or acknowledgment of the presence of sufficient funds is communicated to the RFID toll module's processor.

The RFID toll module can be cross-system compatible by including a plurality of RFID tags in the RFID toll module. Each of which corresponds to a different toll agency, or a different protocol. Each different RFID tag can use a different protocol and radio frequency to support communication with a specific toll agency operating on the tollway that the mobile device is presently located. Hence the system can be compatible over multiple hardware and software systems.

Several different designs may be adopted for the antenna of the RFID toll module, depending on the intended range of detection, intended signal strength and speed of communication, and the frequency being used. It is to be noted that the antenna should be placed as far away as possible from the cellular transceiver antenna in order to avoid interference.

The toll service can utilize various business rules, such as, for example, utilizing batch processing of toll transactions. In some embodiments the toll service, by analyzing the user's behavior (e.g. routes travelled, times travelled, etc.) to generate and offer special offers through either the toll service or third party providers, depending on the user's pattern of travel or time travelled. This kind of "context-based content" can be sent to a user's account and mobile device in the form of coupons or special offers either through email or text messaging.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for automated payment of tolls, comprising:
a RFID toll module that is configured to communicatively couple to a mobile device, the mobile device executing a toll application, the RFID toll module including a plurality of RFID tags that are each configured to communicate with a toll reader using a respective different RFID protocol for a toll transaction, wherein one of the plurality of RFID tags is selected, by the mobile device, to be read by the toll reader, based on a message from the mobile device to the RFID module and based on a location of the mobile device as determined by the mobile device, wherein the mobile device turns on the RIFD module in response to detecting an approach of the toll reader, wherein the selected one of the plurality of RFID tags communicates an identifier to the toll reader in response to being read by the toll reader during the toll transaction, wherein the RFID toll module communicates transaction information to the toll application on the mobile device upon completion of each toll transaction; and
a toll service backend server that maintains a toll account associated with the mobile device, and to which the toll application on the mobile device communicates the transaction information; and
wherein the toll service backend reconciles payment of the toll with a toll agency that operates the toll reader, using funds from the toll account.

2. The system of claim 1, wherein the RFID toll module is associated with the toll account at the toll service backend server, wherein the association is a one-one relationship and the RFID toll module will not function with a mobile device that is not also associated with the toll account.

3. The system of claim 1, wherein the RFID toll module is designed as a sleeve that fits over the mobile device, and wherein the RFID toll module and the mobile device are connected by at least one of an audio jack, a micro universal serial bus (USB) connection, a micro-high definition media interface (HDMI) connection, a proprietary phone connector, a short range wireless radio connection, an integrated dongle, or acoustic communication channel.

4. The system of claim 1, wherein the RFID toll module is embedded in the mobile device.

5. The system of claim 1, wherein the location of the mobile device is determined by a mapping function of the mobile device.

6. The system of claim 1, wherein the toll service backend server uses location information reported by the mobile device for the transaction to verify a location of the toll station.

7. The system of claim 1, wherein the backend server includes a web server that allows a user to access the toll account and to add funds to the toll account.

8. The system of claim 1, wherein the RFID protocol is selected from a plurality of RFID protocols stored on the RFID toll module.

9. The system of claim 6, wherein the toll service backend maintains a record of locations of the mobile device.

* * * * *